No. 809,410. PATENTED JAN. 9, 1906.
M. VAN GÜLPEN.
MACHINE FOR THE MANUFACTURE OF CIGARS, CIGARETTES, CIGAR FILLERS, AND THE LIKE.
APPLICATION FILED JAN. 14, 1903.

16 SHEETS—SHEET 1.

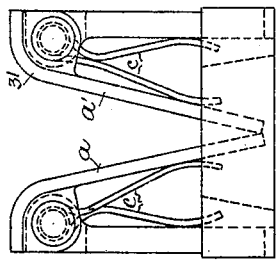
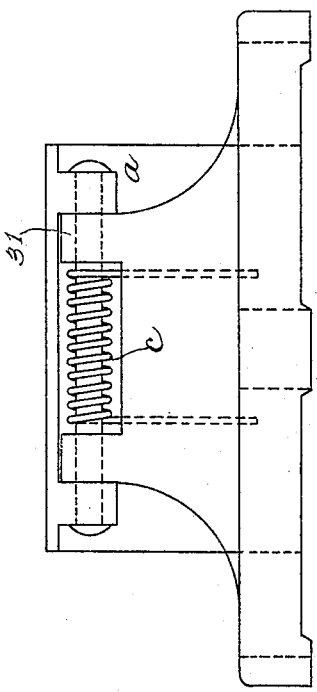
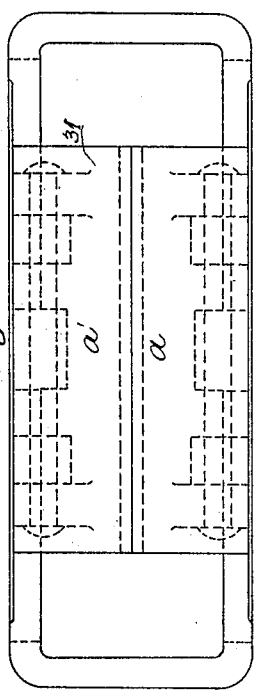

No. 809,410. PATENTED JAN. 9, 1906.
M. VAN GÜLPEN.
MACHINE FOR THE MANUFACTURE OF CIGARS, CIGARETTES, CIGAR FILLERS, AND THE LIKE.
APPLICATION FILED JAN. 14, 1903.
16 SHEETS—SHEET 5.
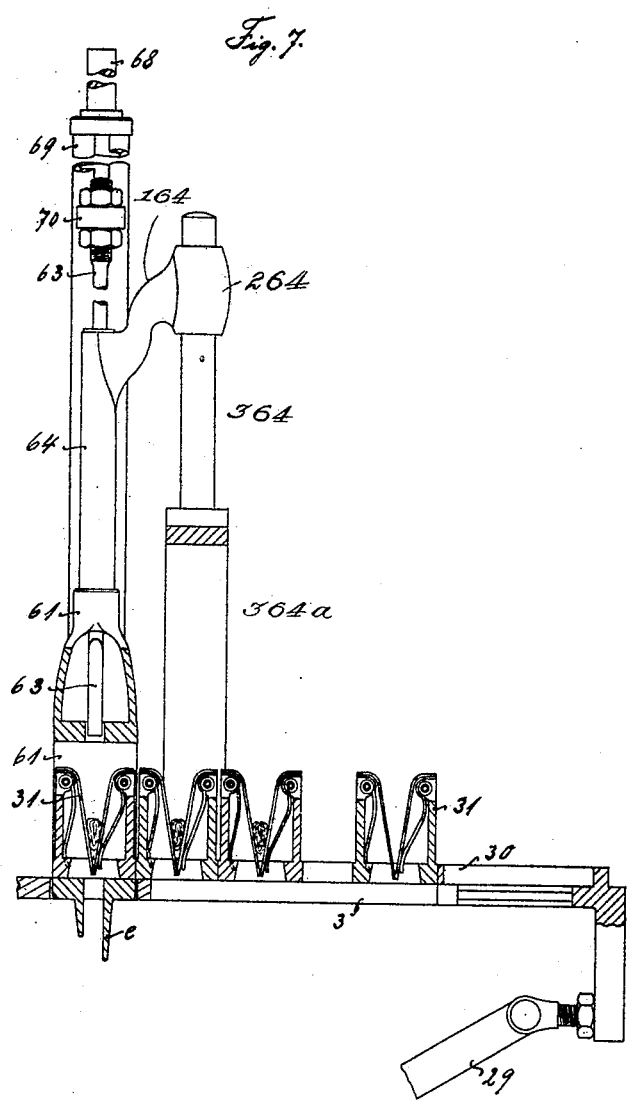

No. 809,410. PATENTED JAN. 9, 1906.
M. VAN GÜLPEN.
MACHINE FOR THE MANUFACTURE OF CIGARS, CIGARETTES, CIGAR FILLERS, AND THE LIKE.
APPLICATION FILED JAN. 14, 1903.
16 SHEETS—SHEET 6.
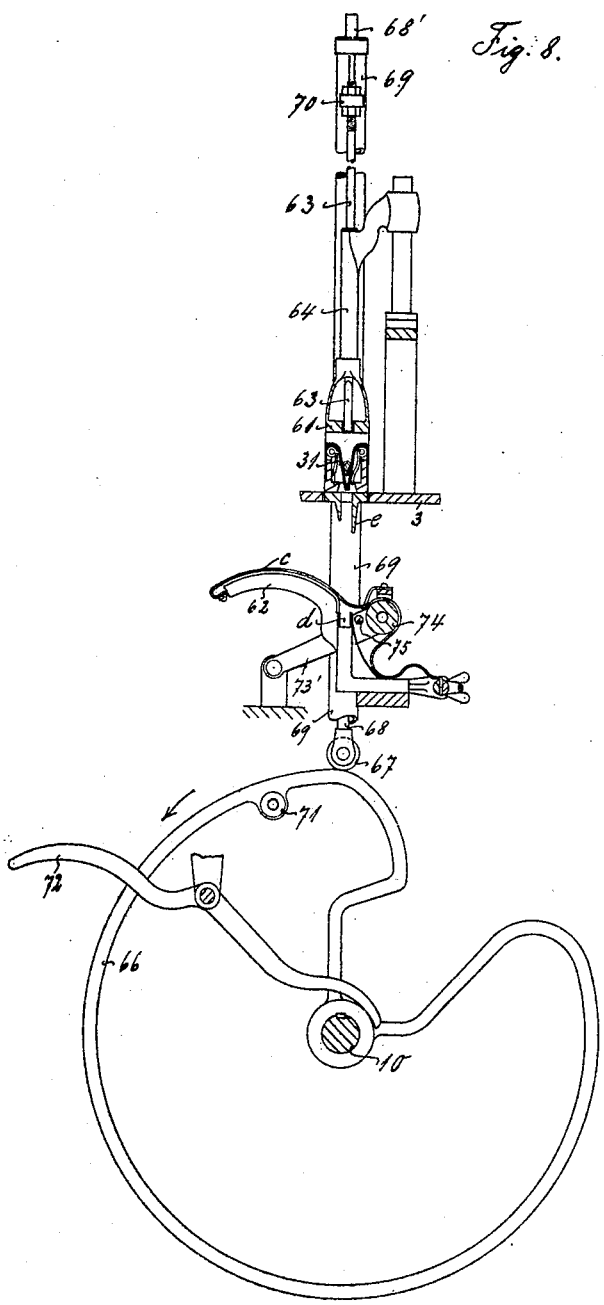

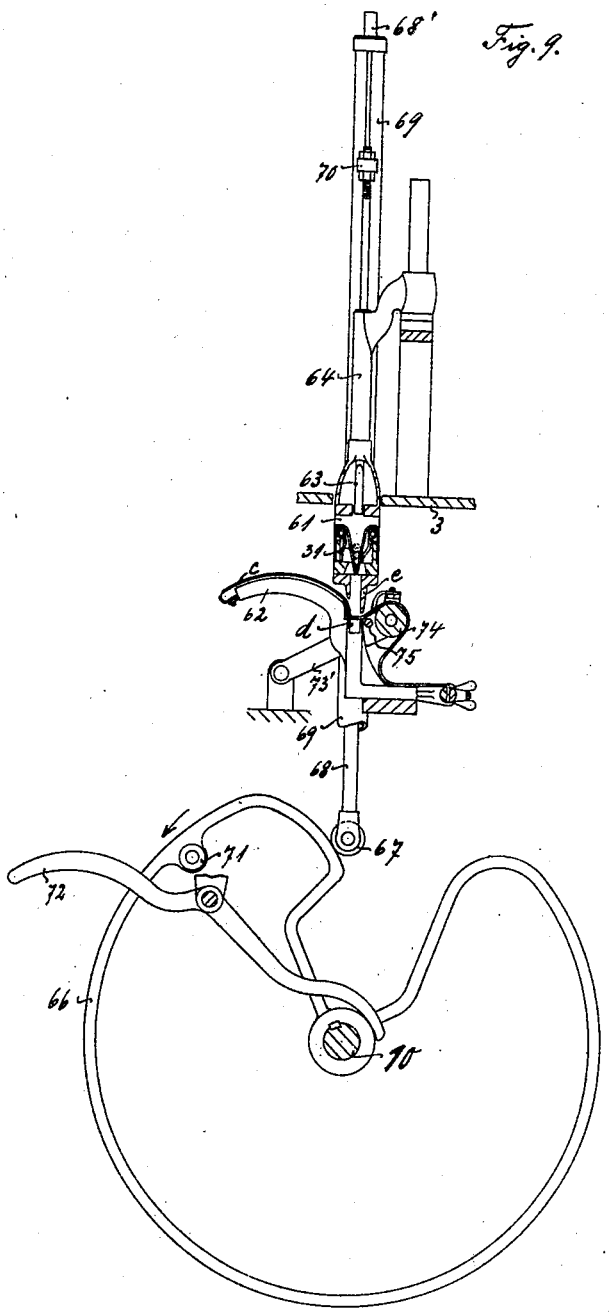

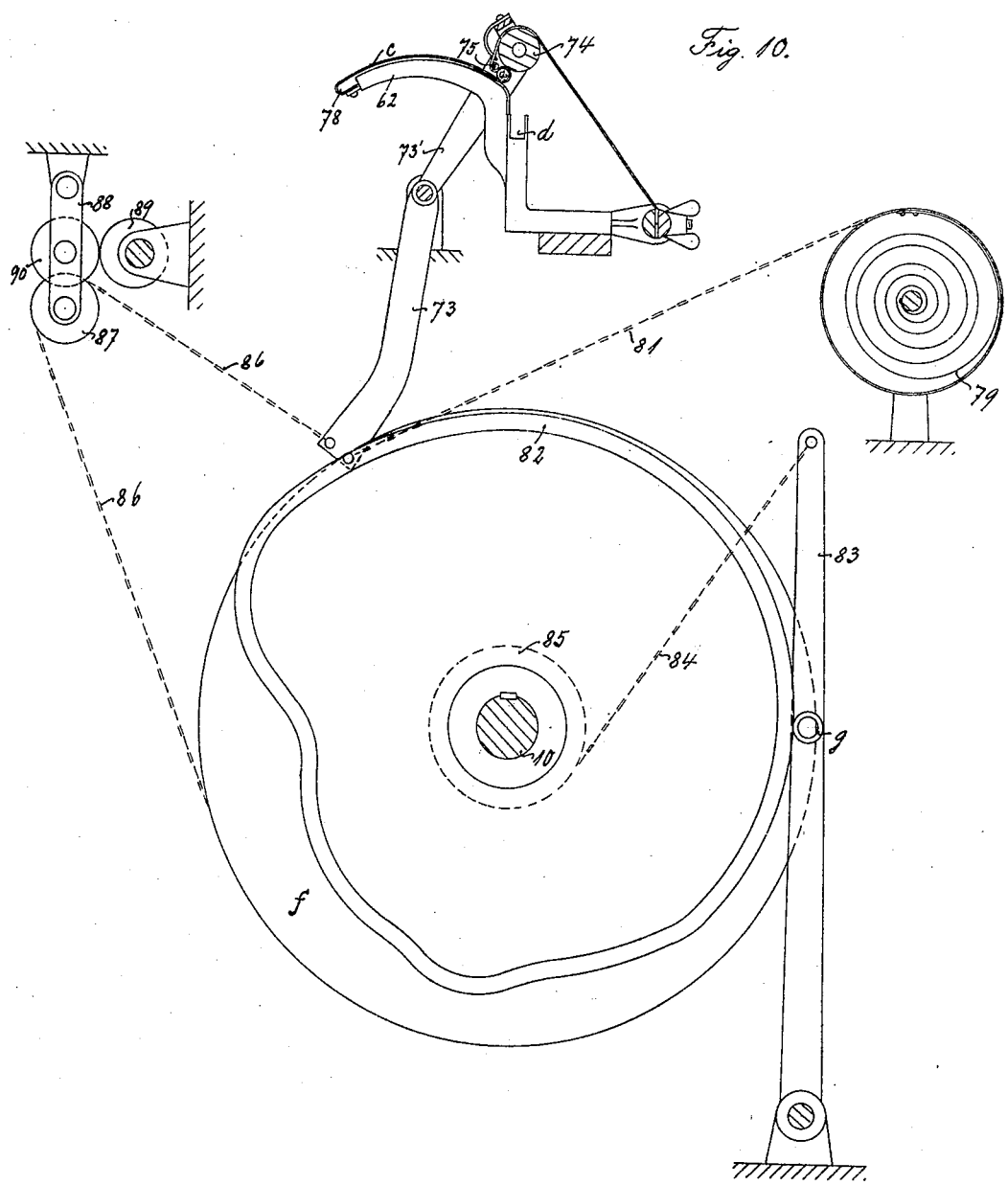

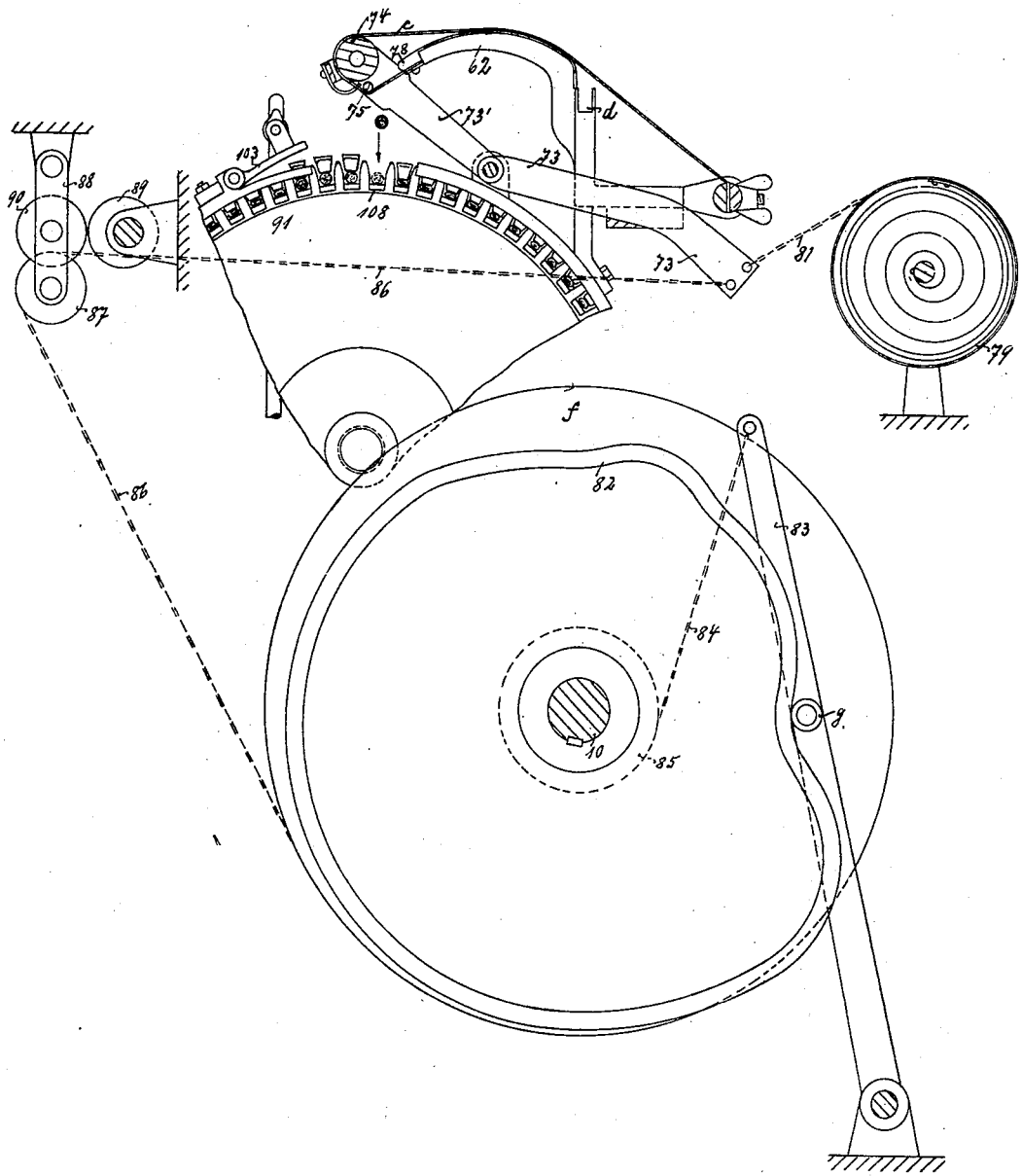

No. 809,410. PATENTED JAN. 9, 1906.
M. VAN GÜLPEN.
MACHINE FOR THE MANUFACTURE OF CIGARS, CIGARETTES, CIGAR FILLERS, AND THE LIKE.
APPLICATION FILED JAN. 14, 1903.
16 SHEETS—SHEET 10.
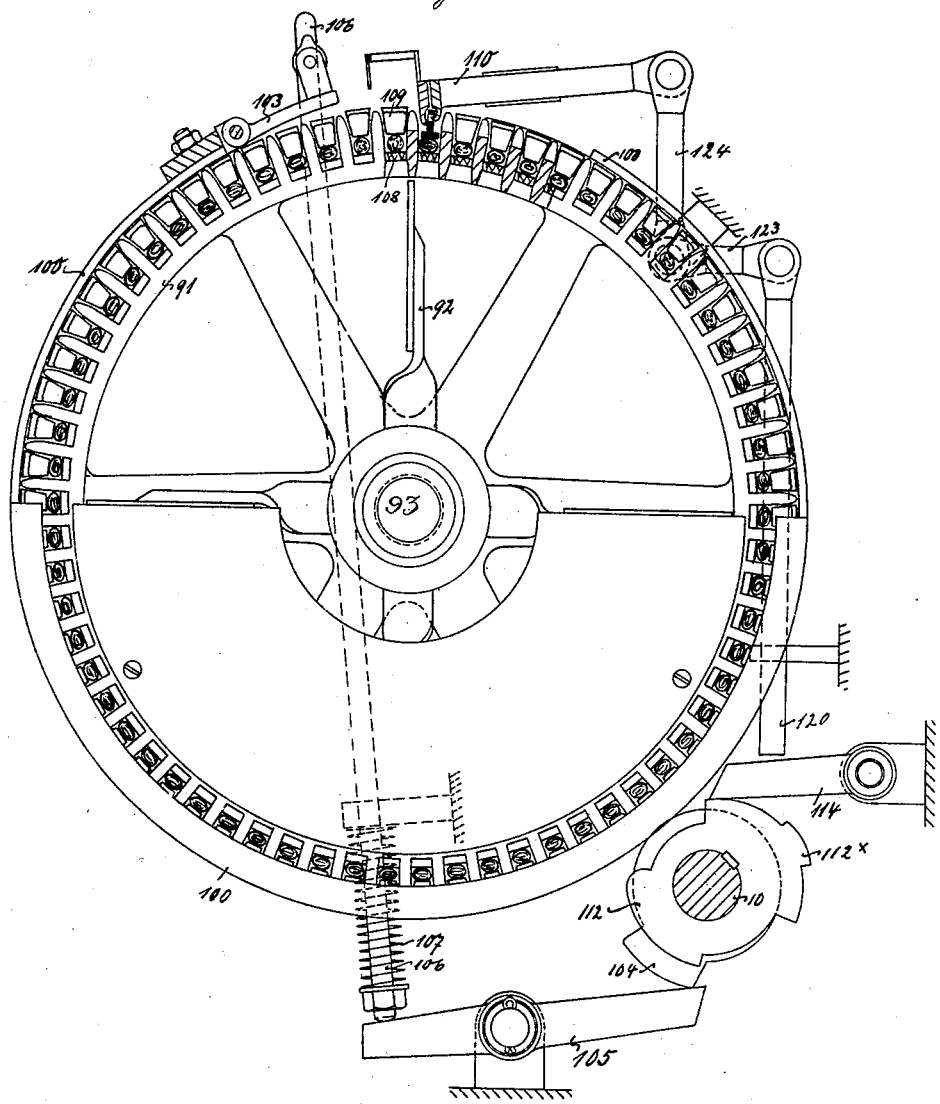

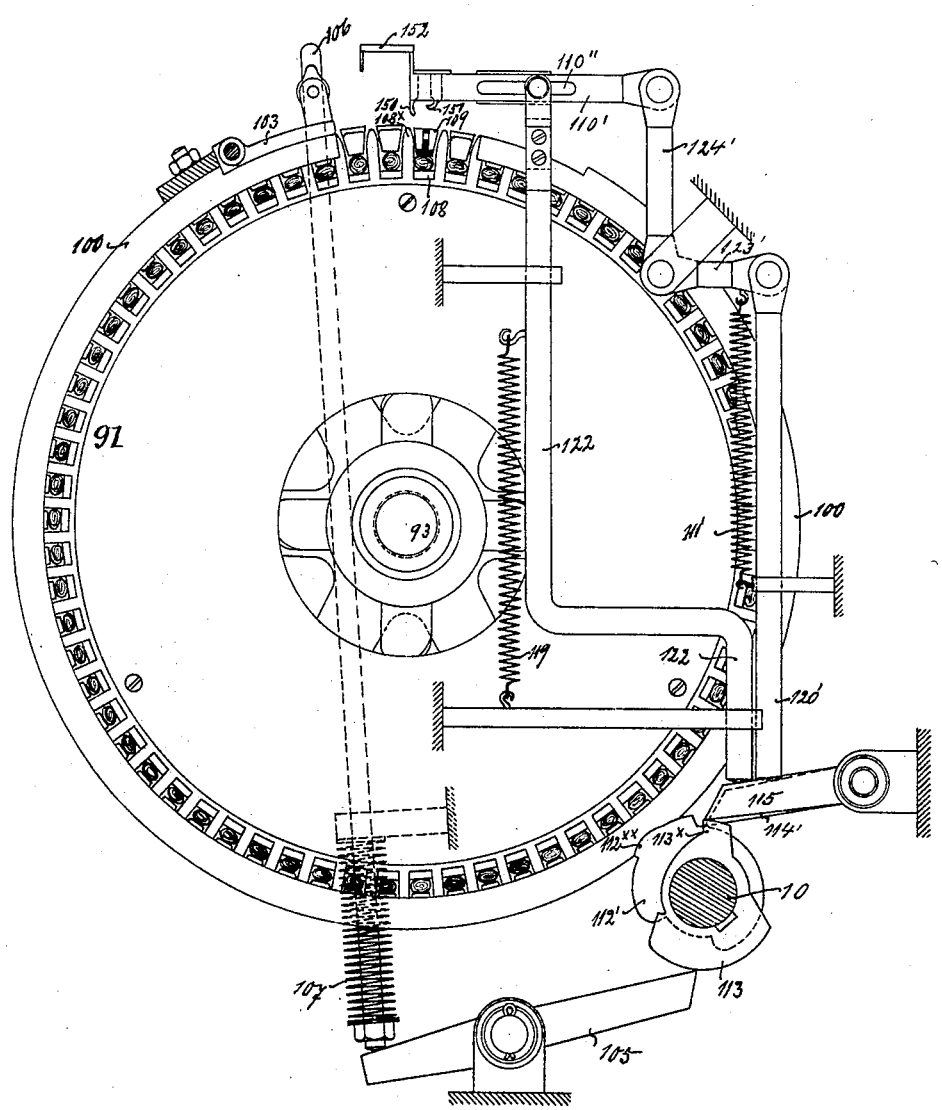

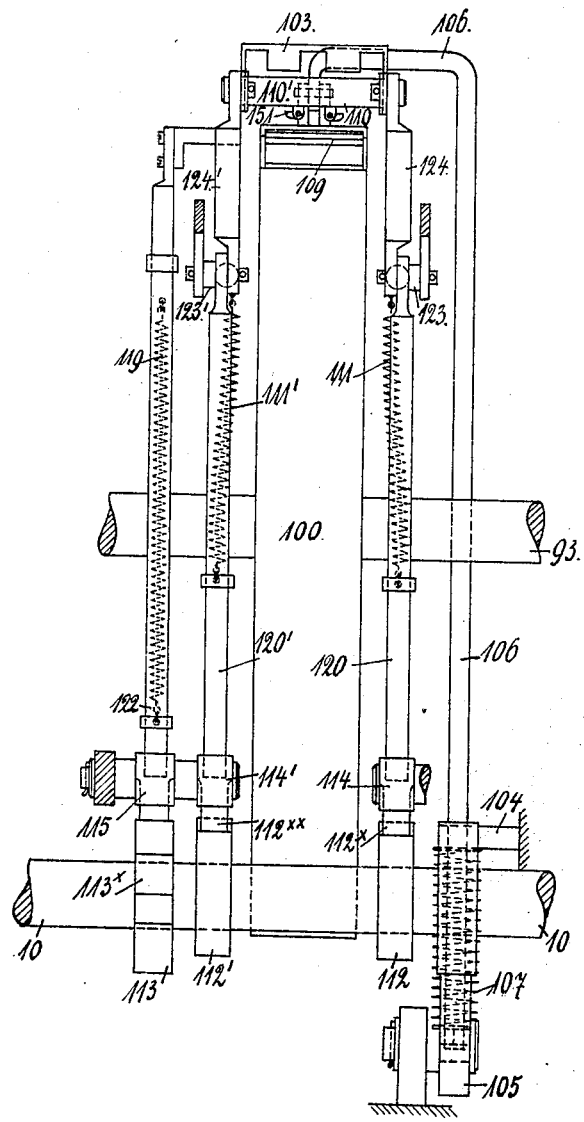

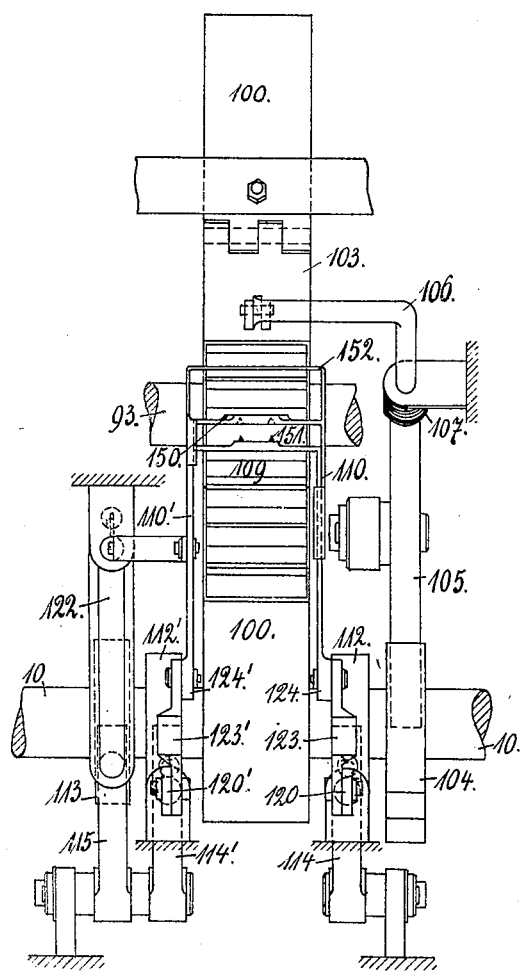

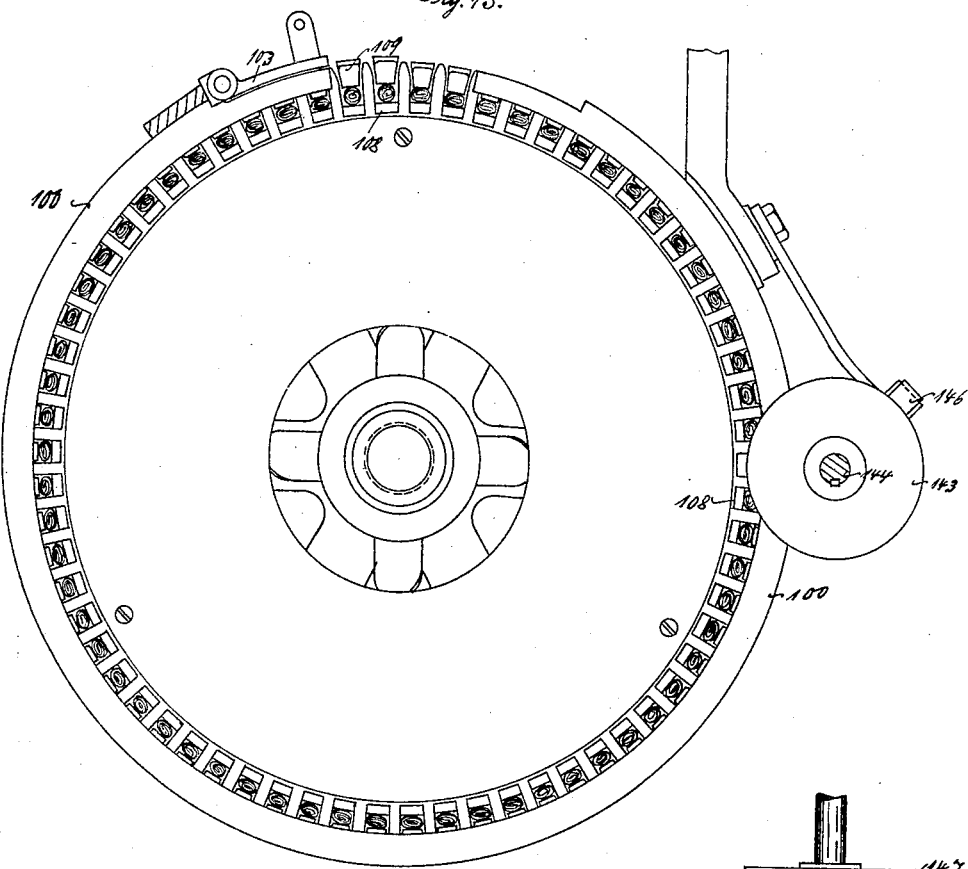
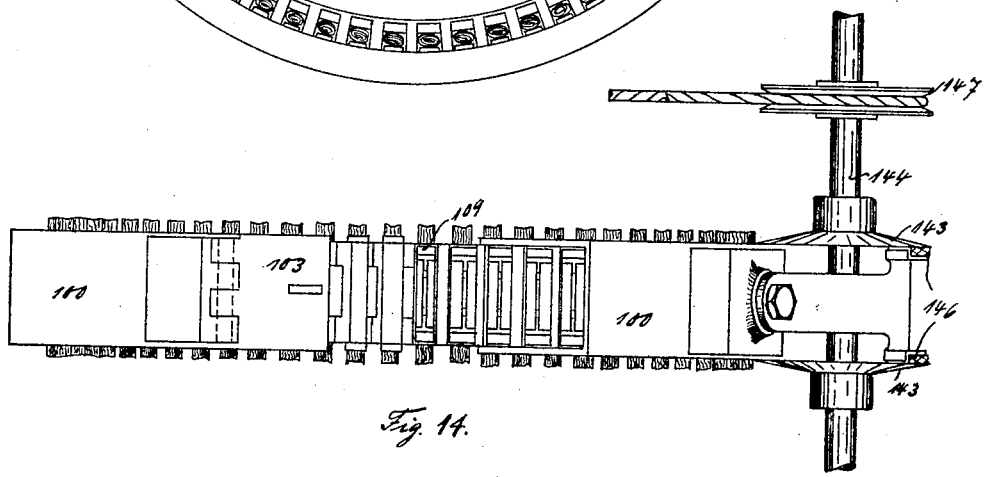

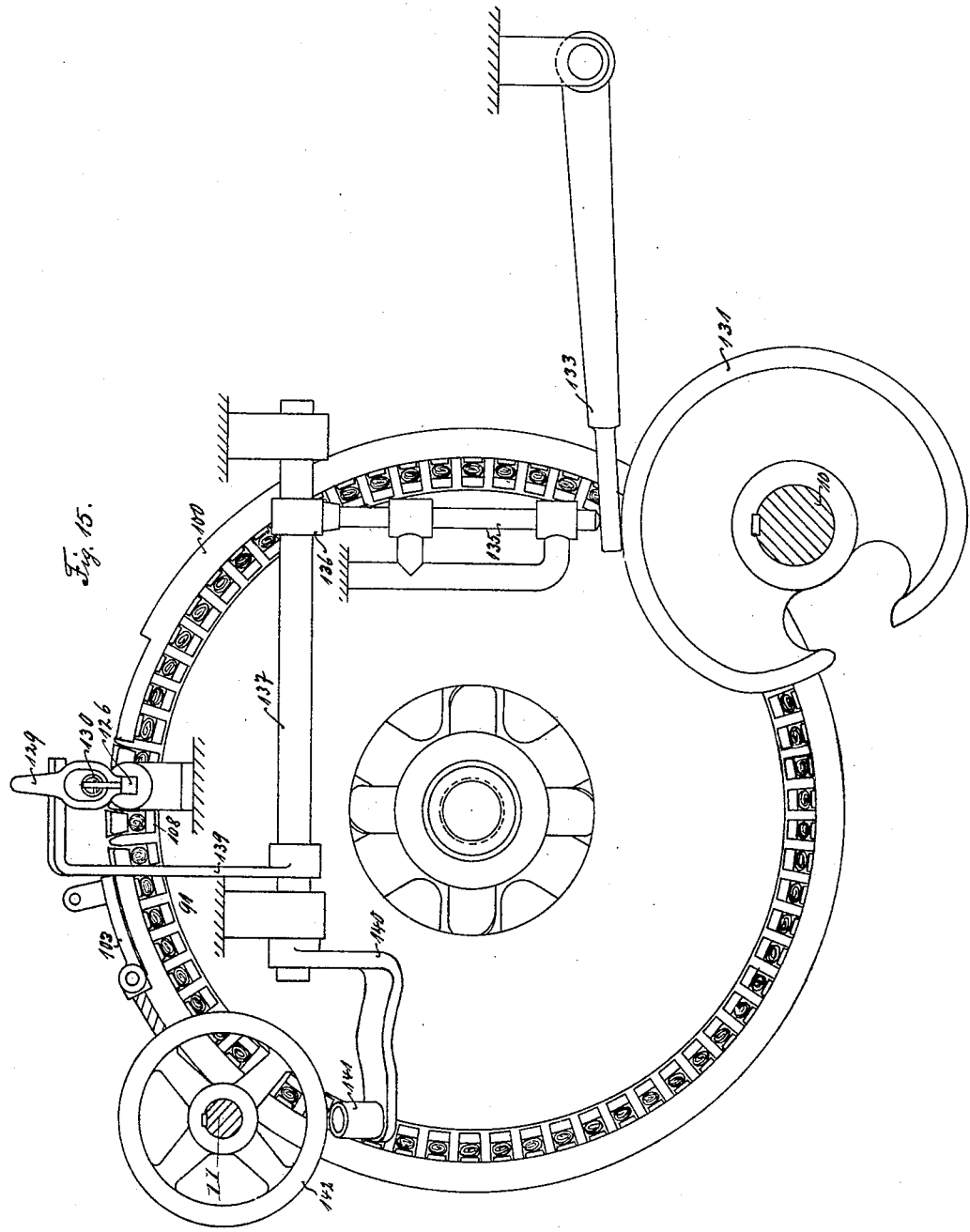

No. 809,410. PATENTED JAN. 9, 1906.
M. VAN GÜLPEN.
MACHINE FOR THE MANUFACTURE OF CIGARS, CIGARETTES, CIGAR FILLERS, AND THE LIKE.
APPLICATION FILED JAN. 14, 1903.

16 SHEETS—SHEET 16.

UNITED STATES PATENT OFFICE.

MAX VAN GÜLPEN, OF MÜLHEIM-ON-THE-RHINE, GERMANY.

MACHINE FOR THE MANUFACTURE OF CIGARS, CIGARETTES, CIGAR-FILLERS, AND THE LIKE.

No. 809,410.   Specification of Letters Patent.   Patented Jan. 9, 1906.

Application filed January 14, 1903. Serial No. 139,014.

*To all whom it may concern:*

Be it known that I, MAX VAN GÜLPEN, a subject of the Emperor of Germany, residing at Mülheim-on-the-Rhine, in the German Empire, have invented a new and useful Machine for the Manufacture of Cigars, Cigarettes, Cigar-Fillers, and the Like, of which the following is a specification.

This invention relates to a machine for automatically manufacturing cigars, cigarettes, cigar-fillers, and the like by a mechanically-driven system of rollers which are so guided by levers that their pressing action and the rolling action of the rolling-apron are always exactly the same. The machine is driven by a single main shaft, and all the operations conveying the loose tobacco from the filling-mold to the rolling-table, rolling the tobacco, and conveying the cigar into the forming apparatus, where it is pressed and cut, take place automatically during one revolution of the main shaft.

The invention is illustrated in the accompanying drawings, in which—

Figure 1:
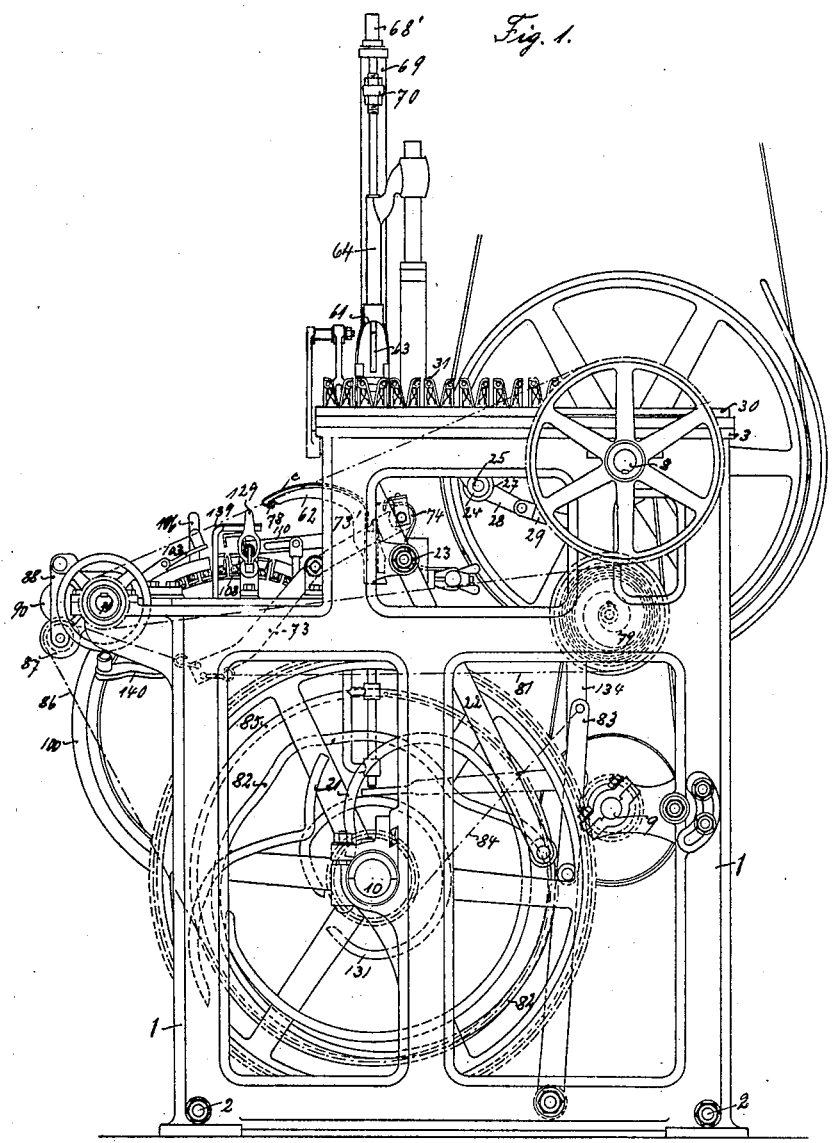
Figure 2:
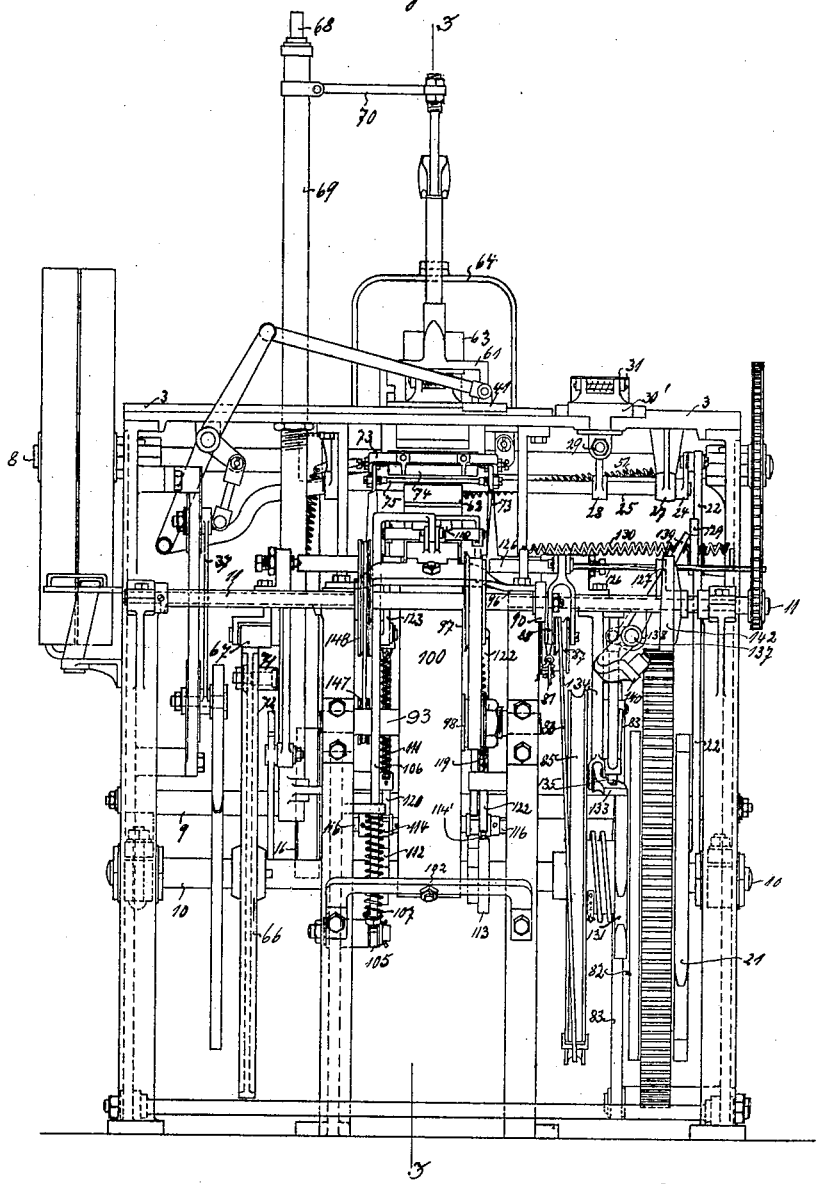
Figure 3:
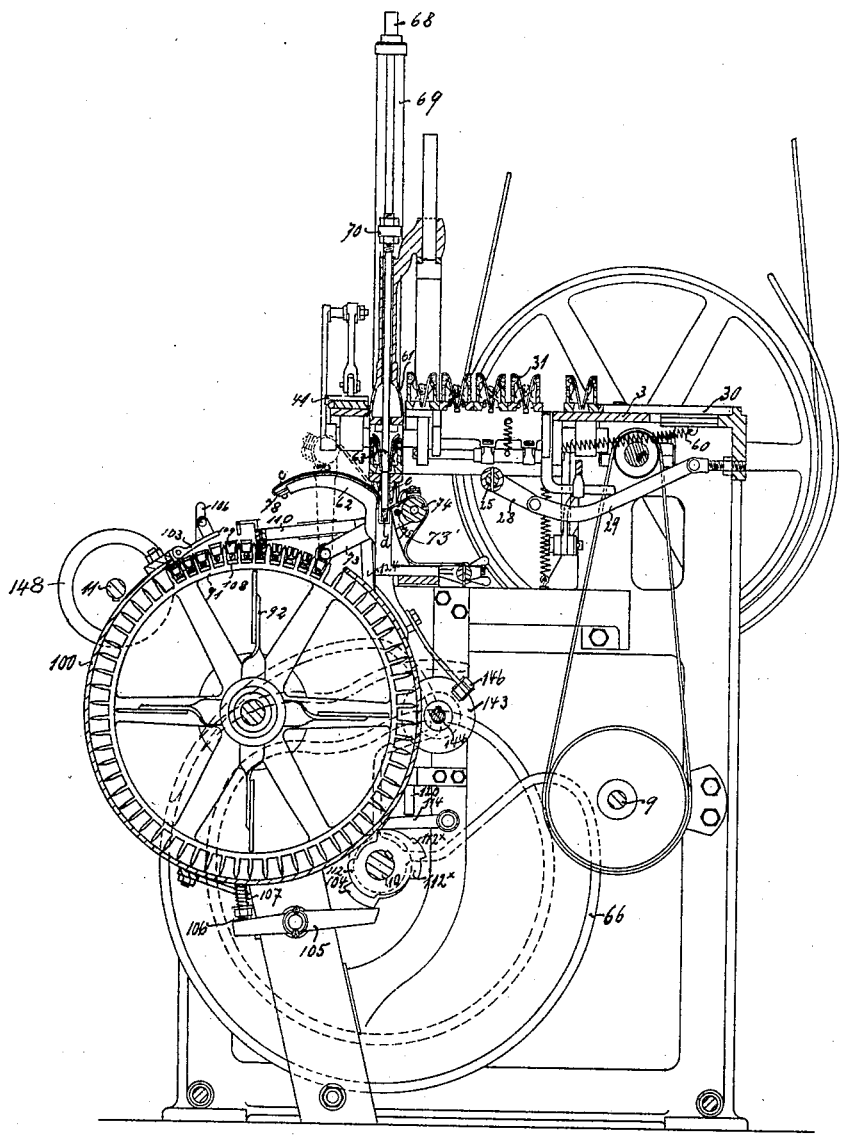
Figure 16:
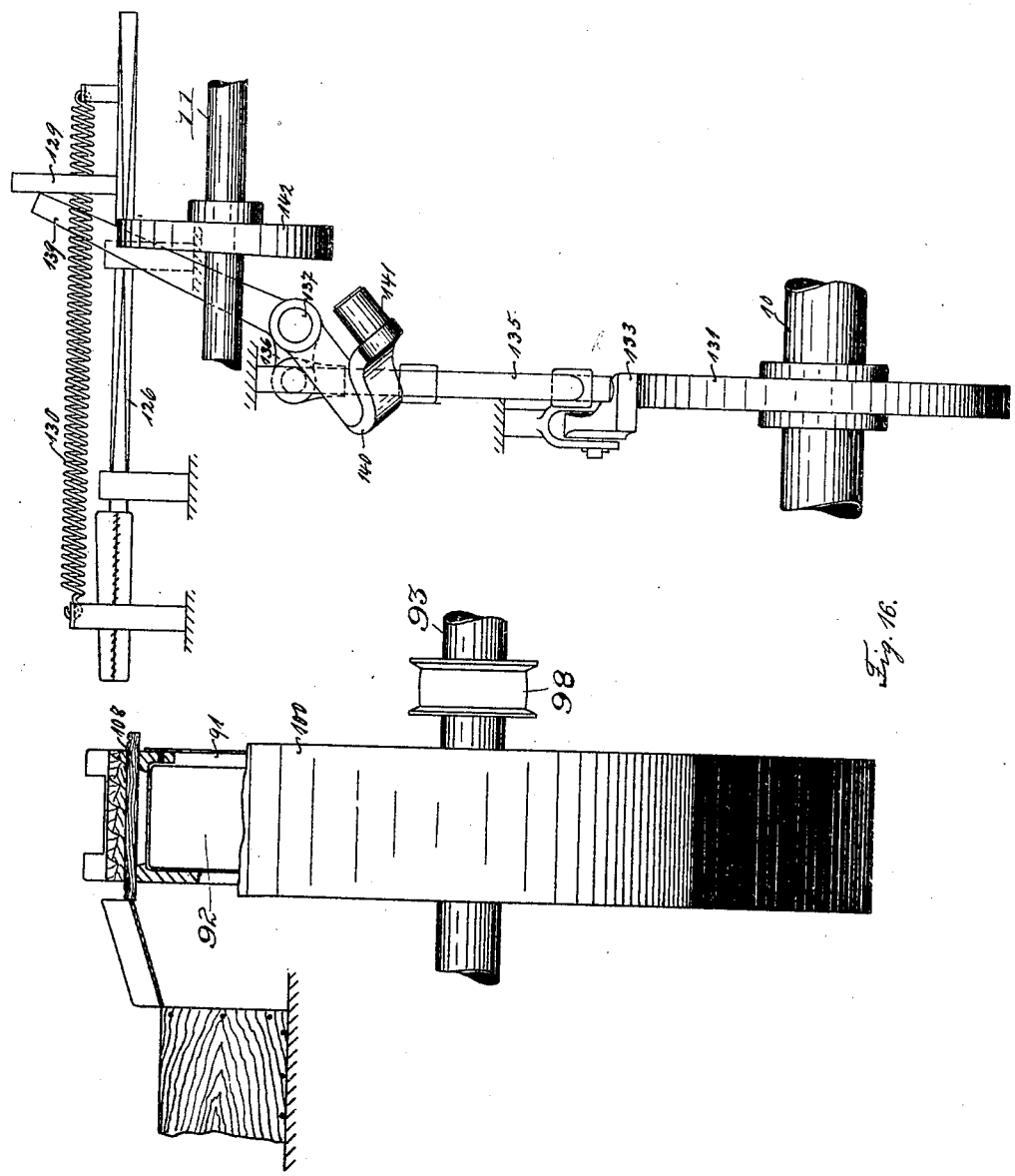

Figure 1 is a side view, Fig. 2 a front view, and Fig. 3 a section on the line 3 3 of Fig. 2. Figs. 4 to 18 are detail views and will be hereinafter described.

All the operations are made mechanically during a single revolution of the main shaft 8, which, through suitable gearing, drives the parallel shafts 9, 10, and 11.

1 1 are side frames or standards of the machine, which are tied together by tie-rods 2 and have the table 3 fixed on the top thereof.

The filling-molds 31 after being emptied are pushed sidewise from the middle of the machine to the right hand by a slide 41. (See Fig. 2.) Here they are caught by a slide 30' and brought to the back of the machine, where they are pushed to the back part of the middle of the machine by a slide (not shown) similar to 41, and from here they are brought forward again by the slide 30. (See Figs. 3 and 7.) Here they are filled by hand with as much tobacco as is required for one cigar or the like and pushed one after the other into the cage 61 by the action of the slide 30.

Fig. 4 is a side view of the filling-mold 31. Fig. 5 is a plan, and Fig. 6 is a front view thereof. It consists of a trough-shaped frame, within which are two plates $a$ and $a'$, which are pivoted to form a flat funnel, which funnel is kept closed at the bottom by springs $b$ and $b'$ acting on the back of the parts $a$ and $a'$. The spring-plates $a$ $a'$ cause the plunger 63 to press the tobacco cleanly and exactly into the recess $d$, Fig. 8, of the rolling-table. The slide 30, which carries the molds 31 from the back of the machine into the cage 61, is moved by the link 29 and the crank 28, which latter is mounted on the shaft 25, mounted in hangers 27, Figs. 1 and 2, and this shaft is turned by a crank 24, operated by the rod 22, moved up and down by the cam 21 on the shaft 10, so that the shaft 25 is moved either in the one or the other direction, whereby the slide 30 is moved either forward or backward. When one mold 31 is filled and put into the cage 61, this cage is lowered, with the center of the mold exactly over the recess $d$ upon the rolling-table 62, and the plunger 13 coming down presses the tobacco into the rolling-apron $c$, filling the recess $d$. (See Figs. 8 and 9.) In order to make these movements, a cam 66 is provided, which is fixed on the shaft 10, Figs. 8 and 9. Upon this cam 66 rolls a little wheel 67, carried by the rod 68, sliding within the tube 69, which is slotted above the machine-table 3. The connecting-rod 70 slides in the slot of the tube 69 and connects the rod 68 with a hollow rod 64, with which the plunger 63 engages frictionally, so that the plunger 63 is always lowered and raised together with the rod 68. The hollow rod 64 has an arm 164, provided with a ring 264, which slides on a guide-post 364, carried by a bracket or frame 364ª, mounted on the table 3. When the cam 66 is turned in the direction of the arrow, Figs. 8 and 9, the roller 67 is lowered, and with it the rod 68 and the cage 61, until the latter touches the rolling-table 62. At this moment the roller 67 falls suddenly into the hollow of the cam 66, and the plunger 63 then slides through the cage member 64 and presses the tobacco out of the mold 31 into the rolling-apron $c$, filling the recess $d$ of the rolling-table 62. Underneath the cage 61 two plates $e$ are provided, forming a funnel with the plates $a$ $a'$ of the mold 31, so that no tobacco can be lost. The cam 66 has a roller 71, which then presses upon one end of the lever 72, so that the other end of this latter raises the roller 67, and with it the rod 68, the plunger 63, and the cage 61. 68' is a sheath for the rod 68, which acts to limit the motion of said rod.

The rolling apparatus now begins to work. A system of rollers 74 and 75, which carry the tobacco-bunch enveloped within a fold of the rolling-apron c, is rolled over the rolling-table 62 to and fro by the double lever 73, so that not the slightest difference in the pressing and rolling action is possible.

The double lever 73 carries at its upper end 73' the presser-roller 74 and the bunching-roller 75. Instead of this latter several rollers may be arranged. The lever 73 is moved forward by a chain 81, which is fastened to a spring-drum 79. When the spring-drum 79 draws the chain 81, the lever 73 is moved, so that it rolls the rollers 74 and 75 forward over the rolling-table 62. The opposite movement is caused by the chain 86, which passes over the roller 87 and is rolled upon a disk $f$. This disk $f$ is rigidly connected to another disk 85, and on this the chain 84 is rolled, which latter is fastened to the upper end of the lever 83. This lever 83 carries a roller $g$, which rolls upon a cam 82. When the cam 82 presses against the roller $g$, Fig. 10, the lever 83 is moved backward and pulls the chain 84, whereby the disk 85 is somewhat turned, and with it the disk $f$, which pulls the chain 86 and also 81, whereby the spring-drum 79 is wound up. When the pressure of the cam 82 diminishes, the chains slacken, so that the spring-drum 79 is able to unwind and move the lever 73. The circumference of the cam 82 is formed so as to move the lever 83 alternately forward and backward, whereby the lever 73 is drawn alternately to and fro. By these alternating movements the covering tobacco-leaf is rolled up accurately upon the cigar-filler and the latter becomes more compact and tight. The roller 87, round which the chain 86 passes, is carried within a pivoted double lever 88, on which is mounted another roller 90. An eccentric roller 89, mounted on the shaft 11, presses against the roller 90, and by the alternate pressure and release of this eccentric roller 89 against the roller 90 the chains are regularly shaken, and through them the lever 73 also and all the moving parts of the rolling apparatus, which is beneficial to the compactness of the cigar-filler under the rollers. When the lever 73 is brought to the end of its movement, the finished cigar has arrived at the point 78 of the rolling-table and drops into one of the molds 108 of the forming apparatus 91, Fig. 11. The lever 83 is then again moved backward by the cam 82 and thus, by means of the chains, the lever 73 is brought back to its first position and the spring 79 is wound up.

The forming apparatus 91 is provided with perforated forming-molds 108 on its whole circumference, and within these molds the cigars are pressed into their finished shape, dried, and cut off on one or both ends. The spokes of the apparatus 91 are arranged on each side of the rim, so that the interior is free for the reception of a fan 92 for drying the cigars, Figs. 3 and 12, which fan is mounted on the shaft 93, provided with the driving-pulley 98. 97 is a pulley on the axle 11, by which belting drives the pulley 98. Said shaft 93 also carries a drum of apparatus 91. The forming apparatus 91 is protected by a casing 100, which is open at the top and carries the pressure-plate 103.

The pressing operation is manipulated as follows: On the shaft 10 is mounted a cam 104, which acts upon one arm of the double-ended lever 105, so that the other arm is lifted, and with it the rod 106, which lifts the pressure-plate 103. When the pressure of the cam 104 diminishes, the rod 106, and with it the pressure-plate 103, is pressed down by a spring 107 acting upon the rod 106. This pressure always takes place when the forming apparatus 91 has moved forward the distance of one mold 108, and it is so moved by the nippers 110, which also place the pressure-blocks 109 into the molds 108 upon the cigars after these latter are dropped from the rolling-table 62.

The pressure-blocks 109 are simple quadrangular parts having a small handle of any suitable form. Each pressure-block is provided with a small hollow adapted to the form intended for the cigar. The forming apparatus 91, with its working parts, is more clearly shown in Figs. 12, $12^A$, $12^B$, $12^C$, which are respectively two side views thereof, showing some of the parts in different positions—a rear view and a top or plan view.

Mounted on the shaft 10 on either side of the forming apparatus are disks. That on the left relative to Fig. 2 has two cams 112 and $112^\times$ and that on the right has two similar cams 112' and $112^{\times\times}$. The cams 112 and $112^\times$ raise and lower the lever 114, (see Figs. 12 and $12^B$,) and the cams 112' and $112^{\times\times}$ raise and lower the lever 114'. (See Figs. $12^A$ and $12^B$.) Resting upon the lever 114 is a rod 120, connected by a bell-crank 123 124 with the cheek 110 of the nippers. Resting upon the lever 114' is a rod 120', which is connected by a bell-crank 123' and 124' with the cheek 110' of the nippers. When the levers 114 and 114' are raised by the cams 112 and 112', they also raise, respectively, the rods 120 and 120', and thus, by means of the bell-cranks 123 124 and 123' 124', the nippers 110 110' are pushed forward one step—i. e., the distance of one mold 108, (see Fig. 12,)— during which motion the nose 150, carried by the nipper 110, presses against the wall $108^\times$ of one mold, so that the whole apparatus 91 is moved forward the distance of one mold. This is caused by the cams $112^\times$ and $112^{\times\times}$ on the disks 112 and 112'. When the lever 114 leaves the cam $112^\times$, the nipper 110 (by means of the rod 120 and bell-crank 123 124)

is retracted a little, so that the hook 151, (see Fig. 12<sup>A</sup>,) fastened to it and engaged in the notch or hole in the handle of the pressure-block 109, leaves this notch. The lever 115 is now raised by the cam 113<sup>x</sup> on the disk 113, so that the rod 122 (see Figs. 12<sup>A</sup> and 12<sup>B</sup>) is also raised and causes the nippers 110 and 110' to move upward. The disks 112, 112', and 113 now turn so much that the levers 114, 114', and 115 become free and the rods 120, 120', and 122 are acted upon by the springs 111, 111', and 119, whereby the nippers 110 and 110' are drawn both backward and downward. The nipper 110 now receives a little forward push by the bell-crank 123 124, so that the hook 151 catches into the notch or hole of the pressure-block 109, so that it can be lifted with the nippers 110 and 110' when they are caused to move up and down by the rod 122, whereby the mold 108 is opened in order to have a cigar pushed out, as described later on, and a fresh one falls in from the rolling-table 62. This up-and-down movement is caused by the eccentric disk 113 by means of the lever 115. After this the movements of the rods and nippers, as described above, are repeated. The frame 152 (see Figs. 12, 12<sup>A</sup>, and 12<sup>C</sup>) on the front of the nipper 110 serves for guiding the falling cigar into the exact mold. The nipper 110' is formed with a slot 110'', in which is located a pin 122' at the upper end of the rod 122, and the nippers 110 110' are connected together, but with capability of sliding in relation to each other by a guide-socket 110''' on the nipper 110', through which passes the nipper 110. By these means the nippers 110 110' are caused to rise and fall together and are enabled to slide in relation to each other to open and close them. The cam projections 112<sup>x</sup> 112<sup>xx</sup> are so shaped and proportioned as to cause the nose 150 and hook 151 to recede from and approach each other at the required times to seize and release the pressure-block 109.

In order to cut the ends of the cigars uniformly on one or both sides of the forming apparatus 91 circular knives 143 are arranged. (See Figs. 13 and 14.) They are mounted on the shaft 144 and are turned from the shaft 11 by means of a band passing over the pulleys 147 and 148. A grinding device 146 may be provided in order to keep the knives always sharp.

When one of the forming-molds 108 has completed its journey around the circumference of the apparatus 91 and has arrived again underneath the nippers 110, the cleaning device 126, Figs. 17 and 18, begins to work by pushing the finished cigar or cigarette out of the forming-mold 108 and cleaning the latter. This is accomplished in the foling manner: On the shaft 10 is mounted a cam 131, having a gap on the cam-surface, on which surface rests one end of a lever 133, Figs. 1, 2, 17, and 18, which lever presses on one end of a sliding rod 135. This rod is connected with a crank 136, turning the shaft 137. On this shaft is also mounted a bent lever 139, which rests with one arm against the abutment 129 on the bolt 126. The shaft 137 carries at its forward end a curved lever 140, with a loose roller 141 mounted thereon. This roller 141 is pressed against the cam 142 on shaft 11 as soon as the gap in the cam 131 comes opposite the lever 133. The rod 135 then drops and the bolt 126 is pushed forward by the spiral spring 130 through that mold 108 which is in front of it. The roller 141 is simultaneously pressed against the cam 142, whereby the bolt 126 makes short intermittent movements forward and backward, and it thus cleans the mold 108. As soon as the cam 131 begins to work again the roller 141 is drawn away from the cam 142, so that the bolt 126 is withdrawn and stops its movements.

What I claim as my invention, and desire to secure by Letters Patent, is—

1. In an automatic machine for the manufacture of cigars, cigarettes, cigar-fillers, and the like, which during one revolution of the main shaft completes one cigar, cigarette, cigar-filler, or the like, the combination of filler-molds; means for transferring bunches from the molds to the rolling mechanism, rolling apparatus arranged underneath said molds consisting of a bunching-roller and a presser-roller, a rolling-table, a recess in said table, a rolling-apron covering said table and recess; a forming apparatus receiving the cigars from the rolling apparatus; a fan in said forming apparatus; and circular knives to trim the ends of the cigars or the like, substantially as set forth.

2. In an automatic machine for the manufacture of cigars, cigarettes, cigar-fillers and the like, the combination of a frame and two thin flat plates forming a funnel, arranged within said frame mounted on pivots at their upper part, and springs normally holding the lower parts of the plates together substantially as set forth.

3. In an automatic machine for the manufacture of cigars, cigarettes, cigar-fillers and the like, the combination of a mechanically-operated rolling apparatus, a curved rolling-table with a recess and a funnel into which the tobacco is pushed by a plunger, a bunching and a pressure roller carried to and fro over the rolling-table during the rolling action and mounted rigidly in a single common firm frame so that no difference in the pressure and rolling action is possible, and means for imparting a shaking motion to said bunching and pressure rollers as they are carried to and fro over the rolling-table substantially as set forth.

4. In an automatic machine for the manufacture of cigars, cigarettes, cigar-fillers, and the like, the combination of a rotatable drum, forming-molds on its circumference, a fan within said drum, and a cutting apparatus arranged to cut the ends of the cigars or the like while in said molds, substantially as set forth.

In testimony that I claim the foregoing as my invention I have signed my name in presence of two subscribing witnesses.

MAX VAN GÜLPEN.

Witnesses:
    Frhrr. von Lyncker,
    Joh. Scholz.